United States Patent

Ishibashi et al.

[11] Patent Number: 5,354,975
[45] Date of Patent: Oct. 11, 1994

[54] CONTACTLESS DATA PROCESSING APPARATUS

[75] Inventors: Yoshihito Ishibashi; Masakatsu Matsumoto; Shin-ichi Hayakawa, all of Tokyo, Japan

[73] Assignee: Tokimec Inc., Tokyo, Japan

[21] Appl. No.: 70,789

[22] Filed: Jun. 3, 1993

[30] Foreign Application Priority Data

Jul. 1, 1992 [JP] Japan ................... 4-173594
Jul. 2, 1992 [JP] Japan ................... 4-175099
Jul. 14, 1992 [JP] Japan ................... 4-186385

[51] Int. Cl.⁵ ............... G06K 5/00; H04K 1/00; G06F 11/00
[52] U.S. Cl. .................. 235/380; 235/382; 380/23; 371/57.1
[58] Field of Search ............ 235/380, 449, 382; 380/23, 24, 49, 2; 375/1; 371/57.1; 340/825.5

[56] References Cited

U.S. PATENT DOCUMENTS

| | | | |
|---|---|---|---|
| 4,459,474 | 7/1984 | Walton | 235/380 |
| 4,821,198 | 4/1989 | Takeuchi et al. | 364/468 |
| 4,835,776 | 5/1989 | Annamalai | 371/57.1 |
| 4,866,616 | 9/1989 | Takeuchi et al. | 364/424.04 |
| 4,924,171 | 5/1990 | Baba et al. | 323/347 |
| 4,953,123 | 8/1990 | Takeuchi et al. | 365/66 |
| 5,023,887 | 6/1991 | Takeuchi et al. | 375/1 |
| 5,070,500 | 12/1991 | Horinouchi et al. | 370/69.1 |

FOREIGN PATENT DOCUMENTS 0366086 5/1990 European Pat. Off. .
3928571 3/1990 Fed. Rep. of Germany .

OTHER PUBLICATIONS

M. Darnell, "Non–Periodic Binary Signals With Good Autocorrelation Properties", International Conference on Control '91, vo. 1, Mar. 28, 1991, pp. 178–183.

Primary Examiner—Donald Hajec
Assistant Examiner—Jeffrey R. Filipek
Attorney, Agent, or Firm—Wenderoth, Lind & Ponack

[57] ABSTRACT

When a control section of a data carrier discriminates a command from a reader/writer, either one of two kinds of pseudo random signals is returned in accordance with a bit 0 or 1 of response data. When two autocorrelation values obtained by correlation arithmetic operations are simultaneously equal to or greater than a predetermined threshold value, the reader/writer determines that a communication has been executed with two or more data carriers, so that an error warning, an access stop, a retry, or the like is executed. The reader/writer compares the autocorrelation peak value obtained from the pseudo random signal from the data carrier with a threshold value. When it is equal to or greater than the threshold value, the reading operation is executed. In the reading operation of continuous data bits from the data carrier, the reader/writer selects the minimum value from among the autocorrelation peak values of the bits obtained by the correlation arithmetic operations and stores the selected minimum value. When the minimum memory value is smaller than a threshold value, it is determined that data could not correctly be read, so that an error is indicated.

13 Claims, 14 Drawing Sheets

CONTACTLESS DATA PROCESSING APPARATUS

BACKGROUND OF THE INVENTION

The present invention relates to a contactless data processing apparatus which is used in the toll use of facilities or an apparatus or the like and, more particularly, to a contactless data processing apparatus for transmitting or receiving data in a contactless manner between a handcarried data carrier which a man carries and a fixed reader/writer.

Hitherto, as a data processing apparatus using a contactless data carrier which is used in the toll use of a ski lift, playing facilities, or the like and is known as what is called a data coin, for example, an apparatus as shown in FIG. 1 is known. In FIG. 1, reference numeral 100 denotes a reader/writer and numeral 200 indicates a data carrier. The reader/writer 100 is fixedly installed and has a control section 120, a read control section 140, a correlation arithmetic operating section 160, and a transmitting section 180. The data carrier 200 is carried by the user as, for example, a pendant or a wristwatch. The data carrier 200 has a non-volatile memory 300 such as an PROM or E$^2$PROM or the like, a control section 240, a pseudo random signal generating section 260, a transmitting section 280, a power supply circuit section 320, and a capacitor 340.

Such a data processing apparatus operates as follows. When the data carrier 200 is allowed to approach within a range of a distance where the reader/writer 100 can communicate, the supply of an operating electric power due to, for example, an electromagnetic inductive coupling from the transmitting section 180 of the reader/writer 100 is received by the transmitting section 280 of the data carrier 200. The received signal is rectified and smoothed by the power supply circuit section 320. A power source voltage $V_{cc}$ is charged into the capacitor 340, thereby making the data carrier operative. In this state, when the read control section 140 of the reader/writer 100 sends a read command to the data carrier 200, the command is decoded by the control section 240 of the data carrier 200 and data bits which are returned are sequentially supplied to the pseudo random signal generating section 260. Two kinds of pseudo random series signals which are used in correspondence to the data bits 1 and 0 have been preset in the pseudo random signal generating section 260. The generating section 260 generates either one of the pseudo random series signals corresponding to the data bit 0 or 1 and sends it from the transmitting section 280 to the reader/writer 100. The same pseudo random series signal as that in the data carrier 200 has been held as a reference signal in the correlation arithmetic operating section 160 of the reader/writer 100. An autocorrelation with the received signal is obtained. When the received signal coincides with the reference signal, an autocorrelation value increases like a peak, so that the reception of the bit 1 or 0 can be discriminated.

However, in such a data processing apparatus using the data carrier, since the contactless communicating system is used, an area in which the data carrier can access the reader/writer is also wide and the reader/writer can simultaneously communicate with two or more data carriers. Therefore, upon reading, read data from two or more data carriers is mixed and an error occurs. That is, when different data bits 0 and 1 are simultaneously transmitted from two data carriers, the data bit of the data carrier locating at the near distance is made effective. On the other hand, when the same data bit 0 or 1 is respectively transmitted from two data carriers, there is a problem in that the same data bit is received from two data carriers and data cannot be correctly read out.

The operating electric power, on the other hand, is supplied from the reader/writer 100 to the data carrier 200. Therefore, in the case where an arbitrary command is generated from the reader/writer 100 and the user tries to obtain a response by the pseudo random signal from the data carrier 200, there is a fear in that when the operating electric power of the data carrier 200 is lacking the electric power is instantaneously shut off during the returning operation of data using the pseudo random series signal.

Furthermore, since the data carrier is allowed to approach the reader/writer and the data is read by the operation of a man, a communicating distance during the transmission of data is not stable. Therefore, when the reading operation from the data carrier 200 is started, a predetermined command is generated and the pseudo random signal is returned. After confirming that the autocorrelation value is equal to or larger than a predetermined threshold value, the reading operation is started. By using such a method, an almost correct data bit can be read. However, even when the autocorrelation value obtained from the pseudo random signal which was returned prior to reading the data is equal to or larger than the threshold value, in the case where the data carrier 100 is away from the reader/writer 200 during the reading operation of the data from the data carrier 100, there is a possibility that the autocorrelation value decreases and the correct data bit cannot be read.

SUMMARY OF THE INVENTION

According to the invention, there is provided a contactless data processing apparatus in which an erroneous reading operation is prevented by recognizing the simultaneous reading operations from two or more data carriers by a reader/writer. First, the invention intends to provide a contactless data processing apparatus for executing the writing or reading operation of data from a reader/writer to a data carrier by a contactless coupling. The data carrier has a pseudo random signal generating section to return either one of two kinds of pseudo random signals which have been predetermined in correspondence to bits 0 or 1 of response data when the data carrier receives a predetermined command from the reader/writer. The reader/writer has: a correlation operating section for holding the same signals as the two kinds of pseudo random signals of the data carrier and for obtaining an autocorrelation with a received signal; and a judging section to determine that two or more data carriers have been simultaneously accessed in the case where the autocorrelation values of two kinds of pseudo random signals obtained by the correlation operating section are simultaneously equal to or larger than a predetermined threshold value. In the case where the judging section determines that two or more data carriers have been simultaneously accessed, an error warning is output, the access at the discrimination time point is stopped, the subsequent access is inhibited, a retry process is executed, and the like. It is also possible to provide a function such that when the data carrier receives an access inhibiting command, it makes it impossible to access all or a part of the memory areas, and in the case where the reader/writer determines that two or more data carriers have been simultaneously accessed, a command to inhibit the access can be also supplied to the data carrier by using an access inhibiting command. Furthermore, since the data carrier generates the operating electric power from the transmission signal of the reader/writer, it is also possible to construct a system in a manner such that in the case where the reader/writer determines that two or more data carriers have been simultaneously accessed, the transmission to the data carrier is stopped and the electric power supply is shut off. Furthermore, in the case where a write accessing section to write data to the data carrier is provided for the data processing section, it is also possible to provide means for inhibiting the write access to the data carrier means when the reader/writer determines that two or more data carriers have been simultaneously accessed.

According to such a contactless data processing apparatus of the present invention, for a response by the pseudo random signal from the data carrier, the autocorrelation values which are obtained with respect to the two kinds of pseudo random signals corresponding to the bits 0 and 1 are monitored, and in case of the reading from one data carrier, either one of the two autocorrelation values certainly indicates the peak value, and in case of the reading from two or more data carriers, in the case where the bits 1 and 0 are simultaneously read out, the peak values simultaneously appear in the two autocorrelation values. Therefore, when two autocorrelation values are simultaneously equal to or larger than a certain threshold value, it is determined that the reader/writer is communicating with two or more data carriers. An error warning is output, and the access is stopped or inhibited. A retry or the like is executed. The erroneous data reading or writing operation is inhibited as mentioned above. However, in the case where the two read-out data completely coincide, such a discrimination cannot be performed. Therefore, it is necessary to perform a check such that an ID signal that is peculiar to each data carrier is read out or the like.

According to the present invention, there is provided a contactless data processing apparatus using a data carrier, in which a state of an operating electric power of the data carrier is discriminated and a certain reading operation can be performed. For this purpose, the reader/writer has: a correlation arithmetic operating section to obtain an autocorrelation between the same signal as a pseudo random signal of the data carrier and the received signal; and a read control section to execute the reading operation when the autocorrelation peak value which is obtained by the correlation operating section is equal to or larger than a predetermined threshold value when the received signal coincides with a reference signal. The read control section of the reader/writer has a first threshold value $TH_1$ and a second threshold value $TH_2$ which is smaller than the first threshold value. When the autocorrelation peak value is equal to or larger than the first threshold value $TH_1$, the read control section executes the reading operation. When the autocorrelation peak value is smaller than the first threshold value $TH_1$ and is equal to or larger than the second threshold value $TH_2$, the comparing process of the autocorrelation peak value obtained from the pseudo random signal which had been returned from the data carrier by the generation of a command is repeated. Further, when the autocorrelation peak value is smaller than the second threshold value $TH_2$, the reading operation is stopped. Moreover, in the read control section of the reader/writer, a differential coefficient indicative of a time change between the preceding and present autocorrelation peak values is obtained and when the differential coefficient is positive, it is determined that there is a tendency such that the autocorrelation peak value is increasing, so that the comparing process with a predetermined threshold value TH ($=TH_1$) is repeated. When the autocorrelation peak value is equal to or larger than the threshold value TH, the reading operation is executed. On the other hand, when the differential coefficient is negative, it is decided that there is a tendency such that the autocorrelation peak value is decreasing, the reading operation can be also stopped.

According to the contactless data processing apparatus using the data carrier of the present invention as mentioned above, in the reading operation of the data carrier, the pseudo random signal is returned by the generation of a command and the autocorrelation value is obtained in order to check the operating electric power. Since the autocorrelation value indicates the sum of the multiplication of the reception series signal and the reference series of the pseudo random signal, the autocorrelation peak value which is derived when both of them coincide is equal to the value that is proportional to the electric power of the received signal. There is a relationship such that the received signal is inversely proportional to the square of the distance. An amplitude of the transmission signal in the data carrier is proportional to the power source voltage. Therefore, when the autocorrelation peak value is equal to or larger than the predetermined threshold value, it is possible to presume that the power source voltage of the data carrier is a voltage which is enough to execute the reading operation, so that the reader/writer executes the reading operation. On the contrary, when the autocorrelation peak value is smaller than the threshold value, it is possible to presume that the power source voltage of the data carrier is lacking, so that the apparatus waits for the recovery of the power source voltage or the reading operation is stopped. It is possible to prevent the instantaneous shut-off of the electric power from occurring during the reading operation.

According to the present invention, a contactless data processing apparatus which can certainly detect an abnormality which occurs during the reading operation of data is provided. For this purpose, the minimum value among the autocorrelation peak values of every bit obtained by the correlation arithmetic operations is selected and stored in a memory at the time of the reading operation of continuous data bits from the data carrier. The minimum value stored in the memory is compared with the predetermined threshold value and when it is smaller than the threshold value, a signal indicative of a read error is generated.

The above and other objects, features, and advantages of the present invention will become more apparent from the following detailed description with reference to the drawings.

DETAILED DESCRIPTION OF THE PREFERRED EMBODIMENTS

Figure 1:
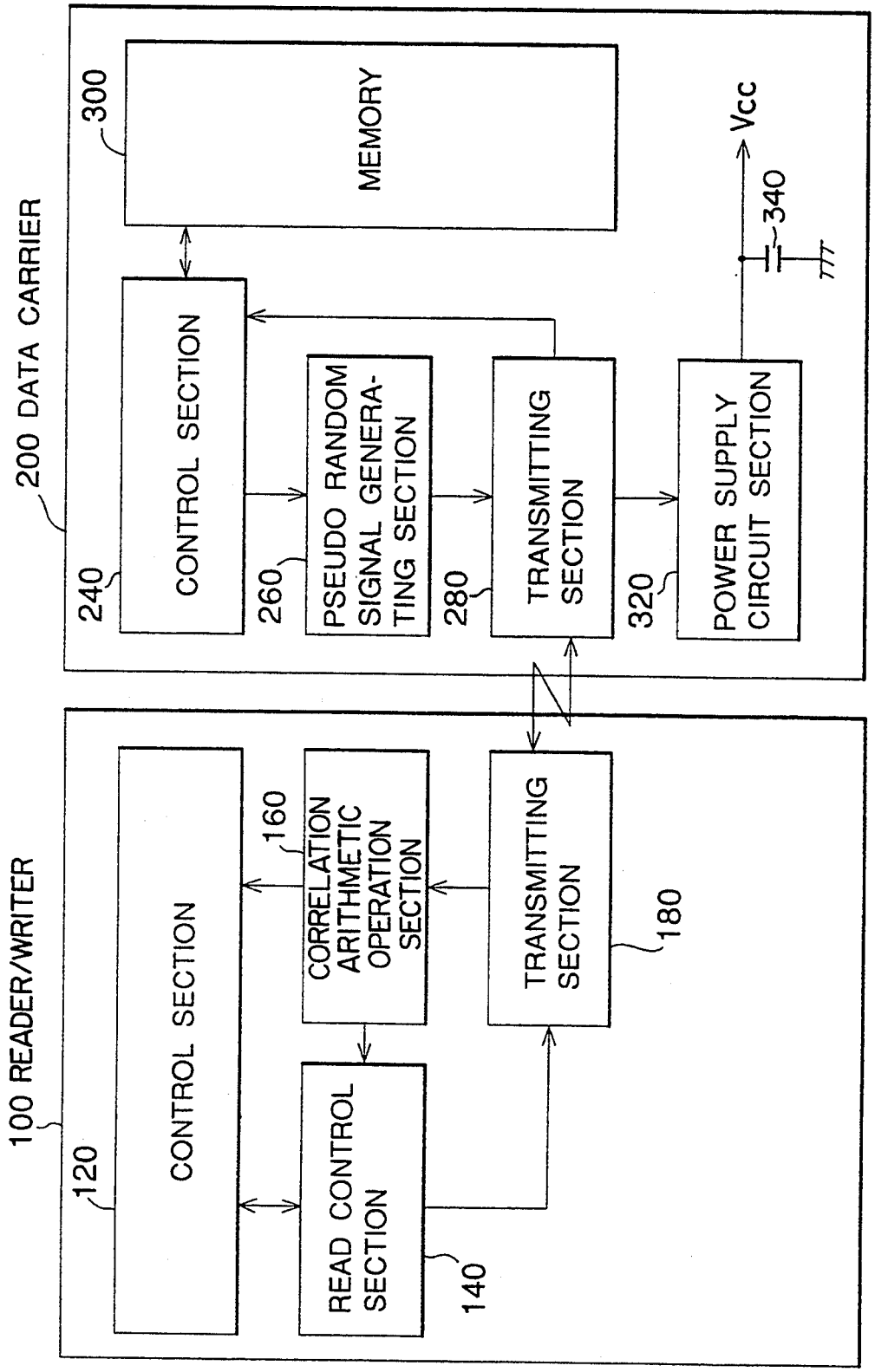
FIG. 1 is an explanatory diagram of a conventional apparatus.
Figure 2:
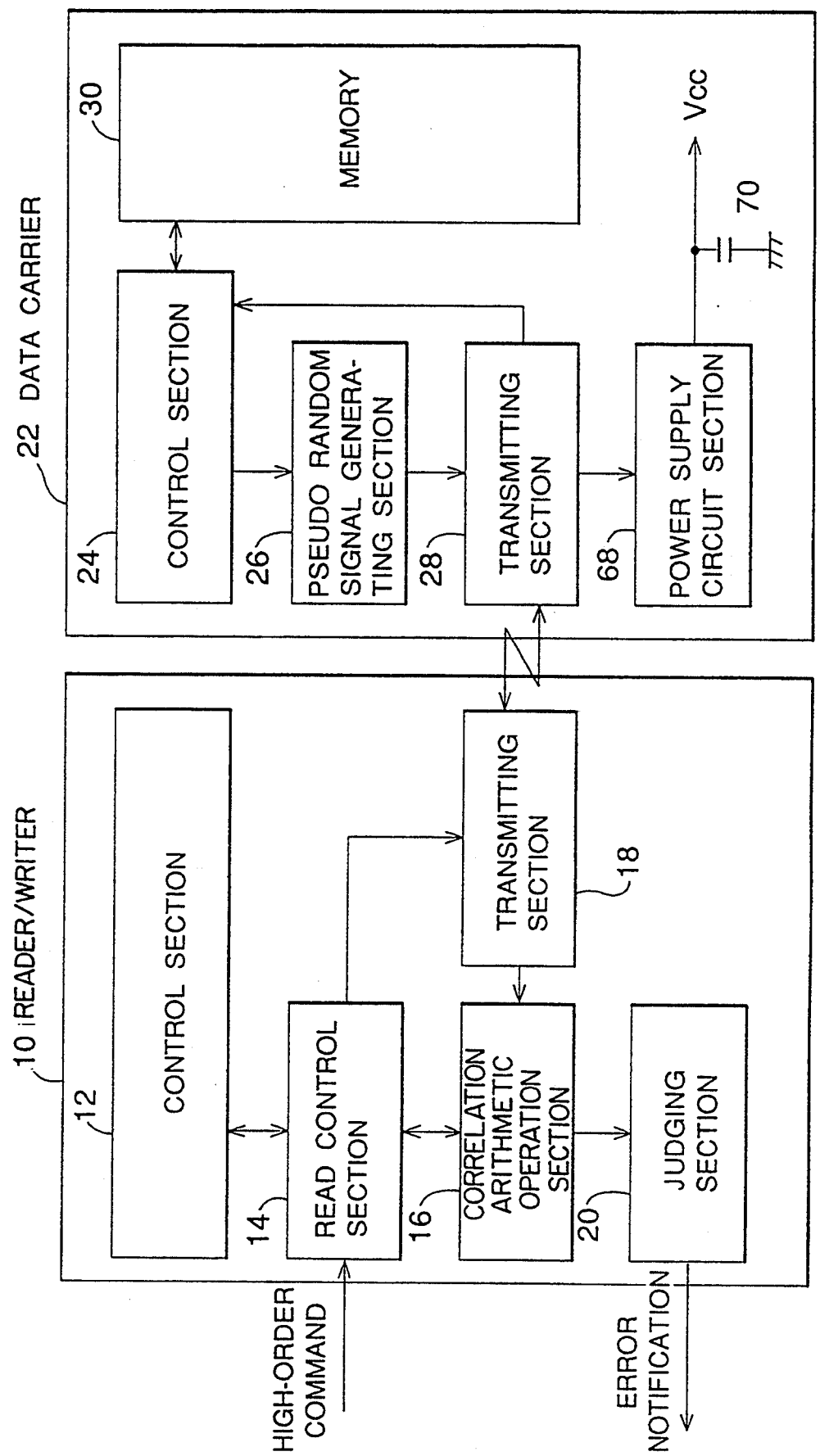
FIG. 2 is a block diagram showing the first embodiment of the present invention.

In FIG. 2, a reader/writer 10 has a control section 12 using an MPU, a read control section 14, a correlation arithmetic operating section 16, and a transmitting section 18. According to the present invention, a judging section 20 is provided to discriminate communicating states with two or more data carriers on the basis of the autocorrelation value obtained by the correlation operating section 16. A data carrier 22 has a non-volatile memory 30 such as an E²PROM or the like, a control section 24, a pseudo random signal generating section 26, a transmitting section 28, a power supply circuit section 68, and a capacitor 70. As a contactless coupling between the transmitting section 18 provided in the reader/writer 10 and the transmitting section 28 provided in the data carrier 22, for example, an electromagnetic inductive coupling using coils is used. Specifically speaking, an FSK modulation system is used for the data transmission from the reader/writer 10 to the data carrier 22. A spread spectrum communication system is used for the data transmission from the data carrier 20 to the reader/writer 10. In case of performing the data transmission by the FSK modulation system from the reader/writer 10 to the data carrier 22, the reader/writer 10 transmits an FSK modulation signal corresponding to, for example, data bit 0 even in a data transmission stop state. When the data carrier 22 enters the effective receiving area of the transmission signal, the FSK received signal from the transmitting section 28 is rectified by the power supply circuit section 68 and is charged into the capacitor 70, thereby producing an operation power source. The data carrier 22 can consequently respond to a command from the reader/writer 10.

Figure 3:
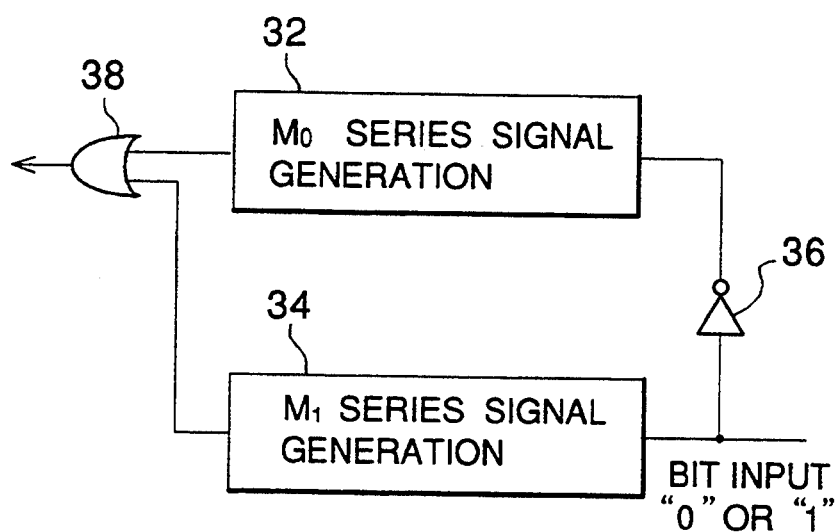
FIG. 3 is an explanatory diagram of a pseudo random signal generator provided in a data carrier in FIG. 2.

FIG. 3 shows an embodiment of the pseudo random signal generating section 26 provided in the data carrier 22. In FIG. 3, the pseudo random signal generating section 26 comprises: an $M_0$ series signal generator 32; an $M_1$ series signal generator 34; an inverter 36; and an OR gate 38. That is, an $M_0$ series signal is determined in correspondence to the data bit 0 of the data that is returned to the reader/writer 10. An $M_1$ series signal is decided in correspondence to the data bit 1. A signal of a predetermined word length, for example, 2043 word length (a 2043 series elements) is generated as each of the $M_0$ and $M_1$ series signals serving as two kinds of pseudo random signals. When the input bit is equal to 0, the $M_0$ series signal generator 32 operates by the inversion by the inverter 36 and generates the $M_0$ series signal through the OR gate 38. On the other hand, when the input bit is equal to 1, the $M_1$ series signal generator 34 operates and generates the $M_1$ series signal through the OR gate 38. Since the data carrier 22 returns the data bit 1 or 0 on a bit unit basis in response to the access from the reader/writer 10, either the $M_0$ series signal or the $M_1$ series signal is transmitted. Therefore, both the $M_0$ series signal and the $M_1$ series signal are not simultaneously transmitted from one data carrier at the same time.

Figure 4:
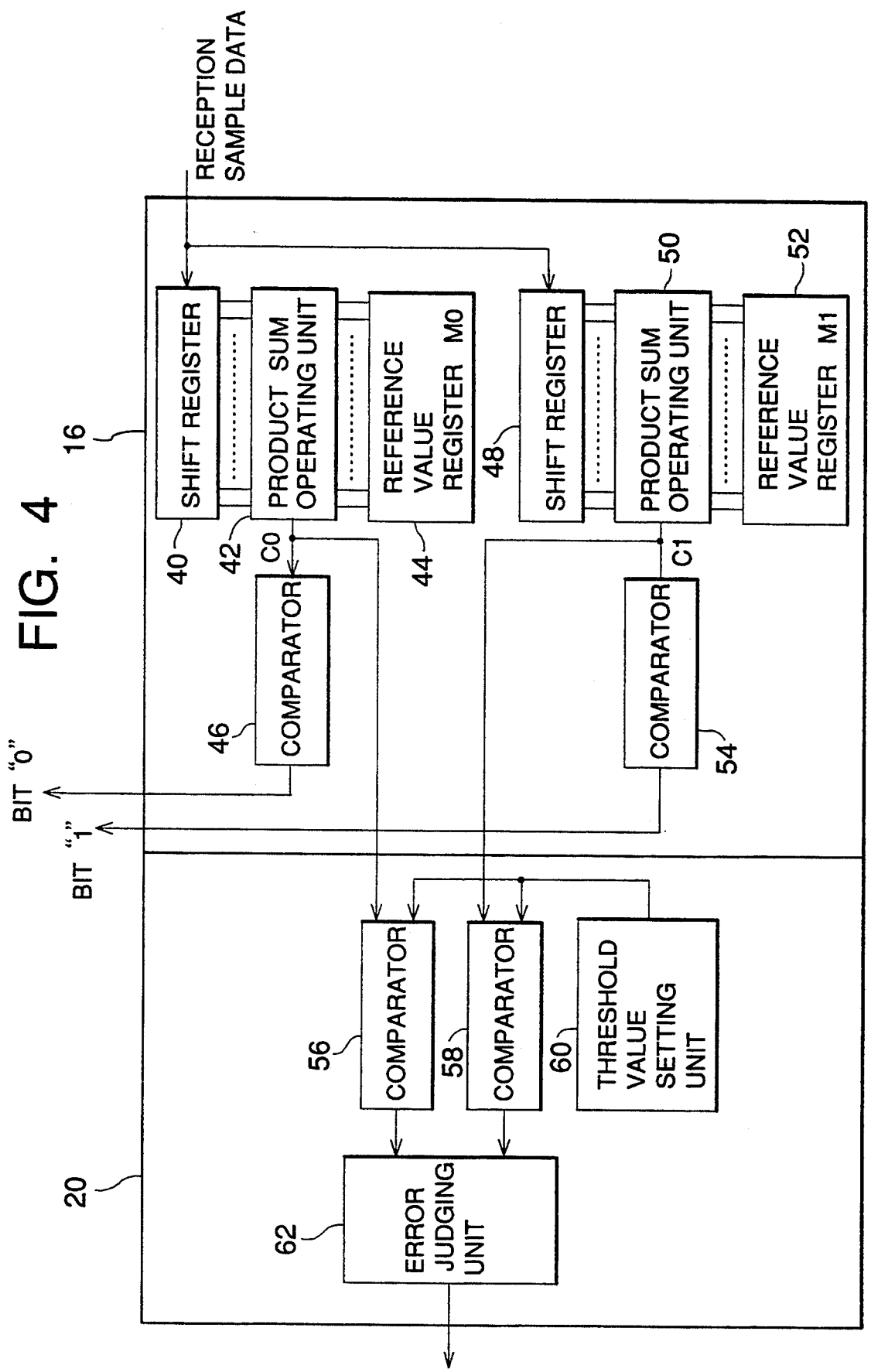
FIG. 4 is an explanatory diagram of a correlation arithmetic operating section and a judging section provided in a reader/writer in FIG. 2.

FIG. 4 shows an embodiment of the correlation operating section 16 and the judging section 20 provided in the reader/writer 10 in FIG. 2. The same correlating circuit section is individually provided in the correlation operating section 16 with respect to the reception bit 0 and 1. That is, shift registers 40 and 48, product sum operating units 42 and 50, reference value registers 44 and 52, and comparators 46 and 54 are provided. The $M_0$ series signal and $M_1$ series signal as pseudo random signals on the reader/writer side shown in FIG. 3 have respectively fixedly been stored in the reference value registers 44 and 52. A word length of each of the $M_0$ series signal and $M_1$ series signal in the reference value registers 44 and 52 is also set to, for example, the same 2043 word length (2043 series elements) as that on the reader/writer side. The reference series signal can be also held in a memory or a fixed circuit such as a wired logic or the like in place of the register. The reception sampling data which has been sampled from the received signal is sequentially supplied in the shift registers 40 and 48. Each time the sampling data is supplied to the shift registers 40 and 48, the product sum operating units 42 and 50 multiply the respective series elements of both of the reception series of the shift registers 40 and 48 and the reference series of the reference value registers 44 and 52, thereby calculating the sums and generating autocorrelation values $C_0$ and $C_1$. The autocorrelation values $C_0$ and $C_1$ from the product sum operating units 42 and 50 are compared with predetermined threshold values by the comparators 46 and 54. When the autocorrelation value is equal to or larger than the threshold value, a discrimination output signal of bit 0 or 1 is generated.

Now, assuming that the sampling series as reception series are set to S and the reference series are set to R, an autocorrelation value C at an arbitrary time t is as follows.

$$C(t) = \sum_{i=1}^{n} S(i + t) \cdot R(i)$$

Now, assuming that the input of the sampling data of certain one-bit data is started, the autocorrelation values $C_0(t)$ and $C_1(t)$ which are obtained by the product sum operating units 42 and 50 are as follows.

$$C_0(t) = \sum_{i=1}^{n} S(i+t) \cdot M_0(i)$$

$$C_1(t) = \sum_{i=1}^{n} S(i+t) \cdot M_1(i)$$

Figure 5:
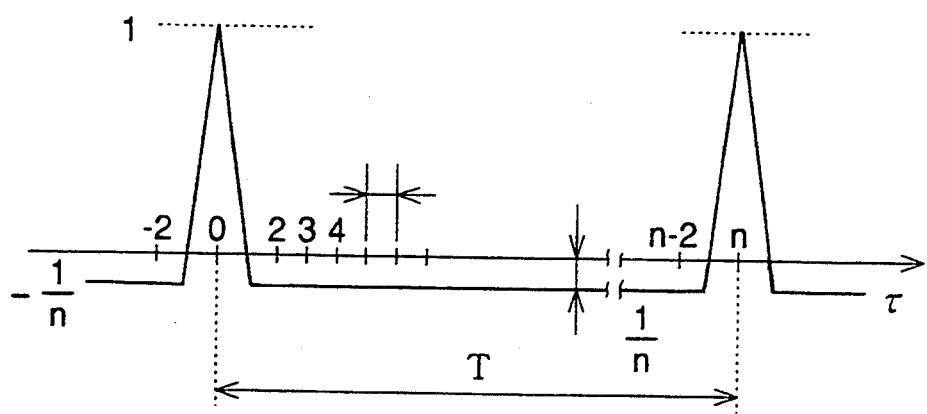
FIG. 5 is an explanatory diagram of an autocorrelation value of a pseudo random series signal.

FIG. 5 is a timechart of the autocorrelation values which are obtained by the product sum operating units 42 and 50 in FIG. 4. FIG. 5 shows the result in the case where the word length of the pseudo random signal, namely, the number of series elements is set to n and the pseudo random signal is repeatedly sent at a period T and the autocorrelation values between the reception series signals and the reference series signal are obtained. When the reception series signal doesn't coincide with the reference series signal, the autocorrelation value is equal to $-(1/n)$. When the reception series signal coincides with the reference series signal, the autocorrelation peak value shown by a relative value 1 is obtained. In the comparators 46 and 54 in FIG. 4, the peak values of the autocorrelation values $C_0$ and $C_1$ which are obtained by the coincidence between the reception series signal and the reference series signal as shown in FIG. 5 are discriminated on the basis of the threshold values and the bit 0 or 1 is generated.

The judging section 20 in FIG. 4 comprises: comparators 56 and 58; a threshold value setting unit 60; and an error judging unit 62. The autocorrelation value $C_0$ obtained with respect to the $M_0$ series signal is supplied to the comparator 56. The autocorrelation value $C_1$ obtained with respect to the $M_1$ series signal is supplied to the comparator 58. The comparators 56 and 58 compare the threshold value TH set in the threshold value setting unit 60 and the autocorrelation values $C_0$ and $C_1$ and generate respective comparison output signals to the error judging unit 62 when $C_0$ and $C_1$ are equal to or larger than the threshold value TH, respectively. The error judging unit 62 monitors the outputs of the comparators 56 and 58. When the comparison outputs are simultaneously obtained from both of the two comparators 56 and 58, that is, when the two autocorrelation values $C_0$ and $C_1$ are simultaneously equal to or larger than the threshold value TH, it is determined that there is a communication with two or more data carriers. An error decision output signal is sent to, for instance, a higher-order apparatus.

Figure 6:
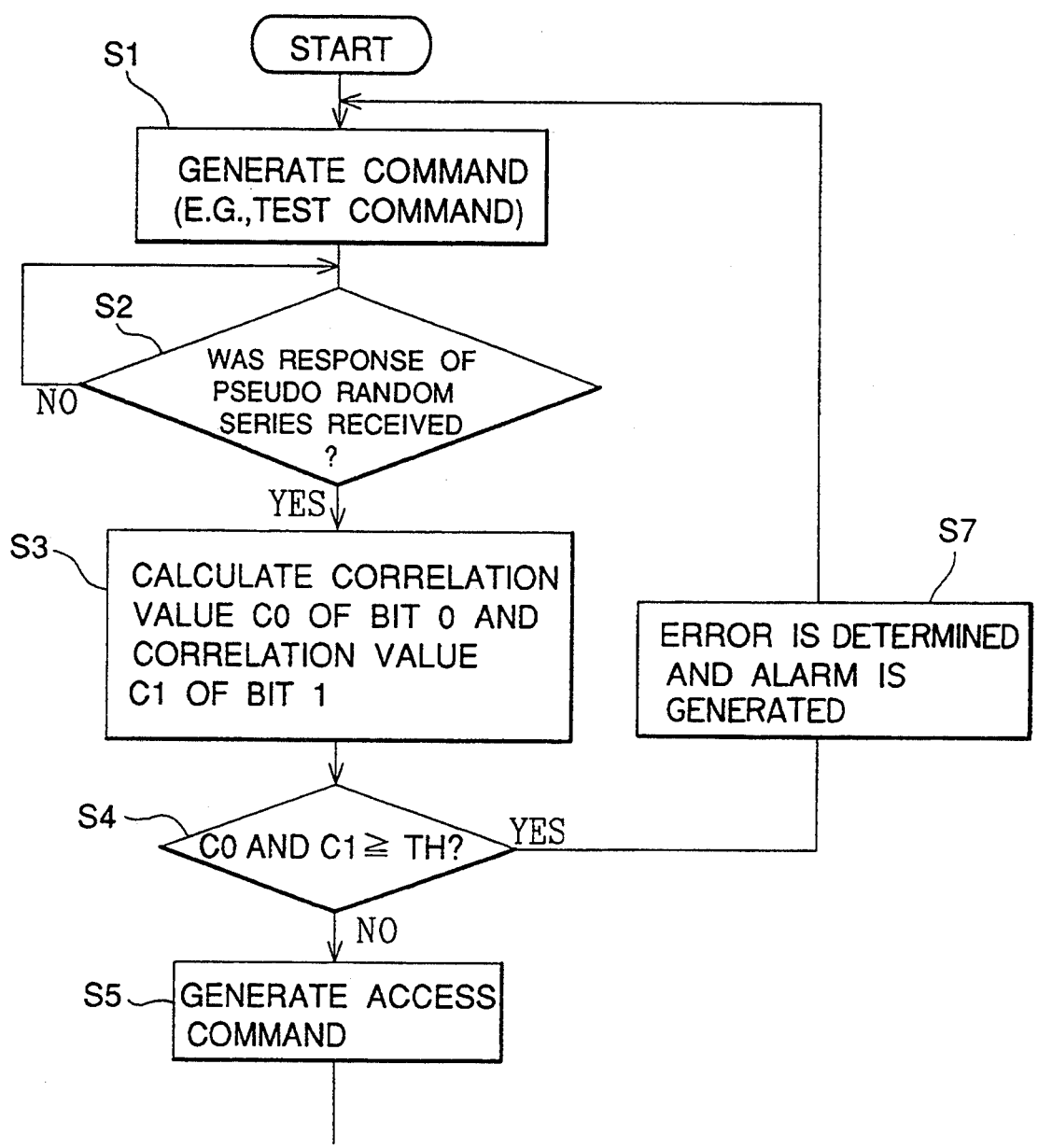
FIG. 6 is a flowchart showing control processes according to the invention.

FIG. 6 is a flowchart showing the processing operation of the reader/writer 10 in FIG. 2. In FIG. 6, first, the read control section 14 in the reader/writer 10 generates a command at every predetermined period as shown in step S1. For example, a test command can be also generated as such a command. When the data carrier 22 enters the area in which the reader/writer 10 can communicate, the data carrier receives the operating electric power supply and the power source voltage $V_{cc}$ from the power supply circuit section 68 exceeds a specified value, so that the data carrier is made operative. The test command which has first been received after the start of the operation of the data carrier is decoded by the control section 24 and a bit response is returned.

A status response is performed as a response of the data carrier 22 to the test command. For example, Such a status response is used as information indicative of the inhibition or permission of the access to the memory 30. In the initial state at the time of the start of the power-ON, since the access to the memory 30 is in an inhibiting state, the data carrier 22 generates a status response indicative of the access inhibiting state in response to the test command. Namely, the data bit 0 indicative of a state in which a key has been locked is returned. Therefore, the $M_0$ series signal corresponding to the data bit 0 is returned. In the case where the key is open so as to permit the access to the memory 30, the data bit 1, namely, the $M_1$ series signal is returned in response to the test command. In the next step S2, a response reception of the pseudo random series signal from the data carrier 22 in response to the test command is discriminated. When the response is received, the processing routine advances to step S3. The correlation operating section 16 executes correlation arithmetic operations with respect to each of the $M_0$ series signal and $M_1$ series signal, thereby obtaining the autocorrelation values $C_0$ and $C_1$. In step S4, the judging section 20 discriminates whether both of the autocorrelation values $C_0$ and $C_1$ are equal to or larger than the threshold value TH or not. When only either one of the autocorrelation values $C_0$ and $C_1$ is equal to or larger than the threshold value TH, it is determined that a normal communication has been executed between the reader/writer and one data carrier. In this case, step S5 follows and, for instance, the key of the data carrier is opened and an ID number read command or the like is generated as an access permission command to enable the memory to be accessed. A permitting state of the memory access is produced and the ordinary data reading process is started.

It is now assumed that the data carrier which had performed the accessing operation for the first time was temporarily away from the communication able area and another data carrier entered the communication able area. The reader/writer 10 determines that the data reading operation from the data carrier which has been executed so far cannot be performed, so that it is determined that the key has been locked due to some cause. Thus, the reader/writer 10 again generates a read command of the ID number. It is now assumed that two data carriers simultaneously responded to the read command of the ID number. In this case, the data carrier whose key has already been opened returns the $M_1$ series signal in correspondence to the data bit 1. On the other hand, the data carrier which newly received the access returns the $M_0$ series signal corresponding to the bit 0 because the key is not open. Therefore, both of the autocorrelation values $C_0$ and $C_1$ of the bits 0 and 1 obtained in step S3 exhibit the peak values. In step S4, two autocorrelation values $C_0$ and $C_1$ are equal to or larger than the threshold value TH. Therefore, it is determined that the communications with two or more data carriers were simultaneously performed, thereby allowing an alarm to be generated on the basis of the error decision in step S7. In the embodiment, after the alarm was generated, the processing routine is returned to step S1 and a retry operation to repeat the processes until the autocorrelation values $C_0$ and $C_1$ are together lower than the threshold value TH in step S4 is executed.

The embodiment of FIG. 6 has been described with respect to the example in the case where a bit response according to the opening/locking state of the key from the data carrier is executed in response to the generation of the test command. However, even during the ordinary accessing operation after the key was opened, two autocorrelation values $C_0$ and $C_1$ are compared with the threshold value TH. When two autocorrelation values $C_0$ and $C_1$ are equal to or larger than the threshold value TH together, it is determined that the communications with two or more data carriers are executed, so that a process to generate an error alarm, retry, or the like is performed. The process in case of determining that the communications with two or more data carriers are simultaneously executed is not limited to the error warning or retry. It is also possible to stop the access to the data carrier at the time point of such a decision or to inhibit the access to the data carrier after completion of such a decision. Further, in addition to the inhibition or stop of the access by the reader/writer, it is also possible to construct the system in a manner such that the data carrier whose key has already been opened by the access permission is returned to a key locked state, namely, an access inhibiting state. As an embodiment for locking the key in the data carrier, an access inhibiting command to make it impossible to access to all or a part of the memory area when a predetermined command is received is provided for the data carrier. In the case where the reader/writer determines that two or more data carriers simultaneously accessed, the data carrier is set into a key locked state by instructing the access inhibition by using such an access inhibiting command. Since the data carrier has the power supply circuit section 68 as means for generating the operating electric power from the transmission signal of the reader/writer, when the reader/writer determines that two or more data carriers simultaneously accessed, it is also possible to shut off the electric power supply by stopping the transmission of the FSK signal to the data carrier. When the electric power supply is shut off in the access permitting state, so long as the electric power is subsequently supplied, the data carrier is returned to the key locked state.

Figure 7:
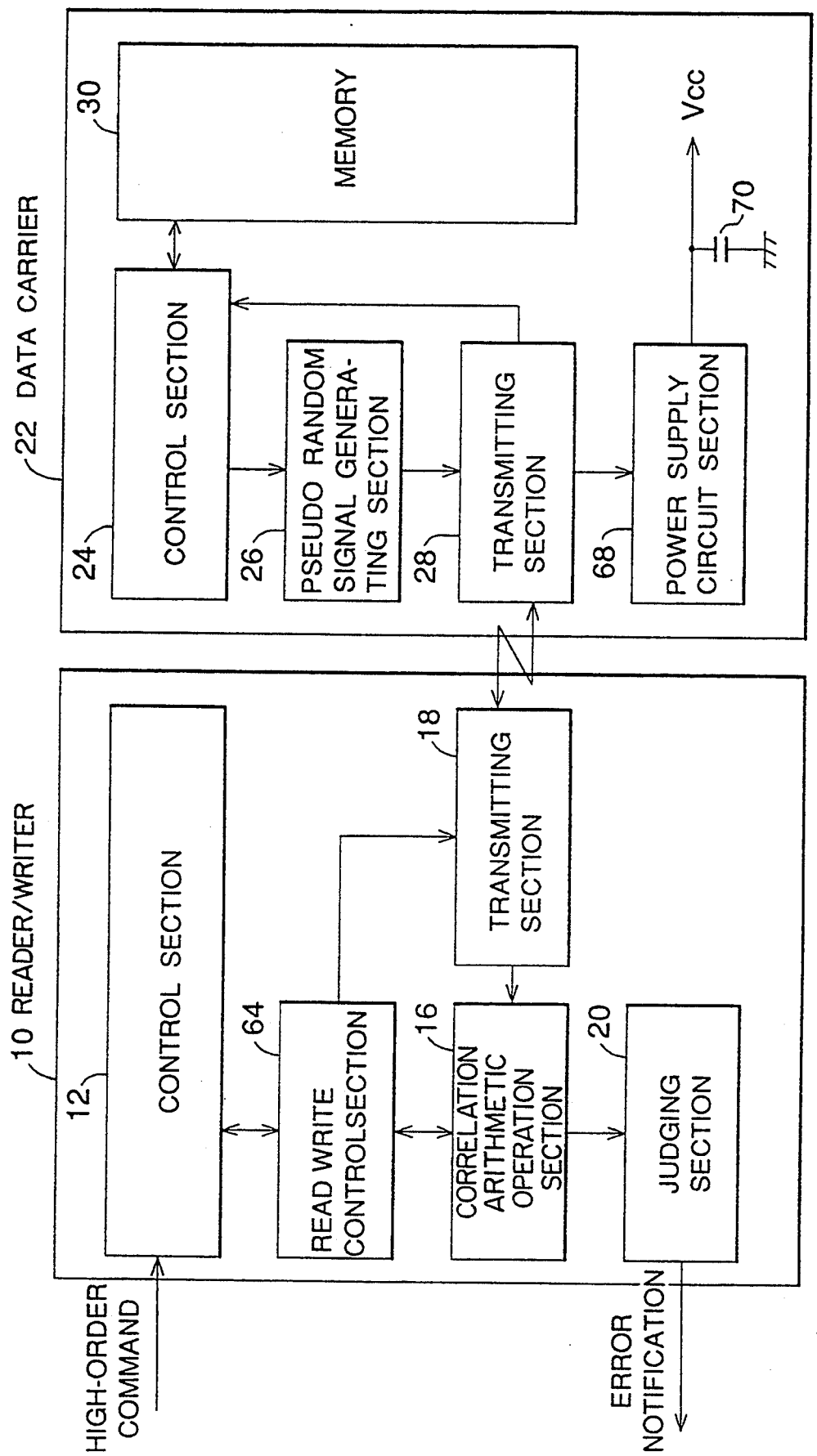
FIG. 7 is a block diagram showing a modification of FIG. 2.

FIG. 7 shows a modification of FIG. 2. The embodiment of FIG. 2 shows only the reading function of the data carrier 22 by the reader/writer 10. In FIG. 7, a read/write control section 64 is provided for the reader/writer 10. The writing function of the memory 30 is also provided for the control section 24 of the data carrier 22, thereby enabling the reading and writing operations of the memory 30 to be executed by the contactless coupling. Even in such a modification in which data can be written, when the judging section 20 determines that the reader/writer has simultaneously accessed two or more data carriers, the write access to the data carrier is inhibited, thereby preventing the same data from being simultaneously written into two or more data carriers.

According to the invention as mentioned above, when both of the autocorrelation values of two kinds of pseudo random signals corresponding to the data bits 0 and 1 are equal to or larger than a predetermined threshold value during the communication with the data carriers, it is possible to decide that the reader/writer is in the communicating state with two or more data carriers. Therefore, on the basis of the result of the judgment, a proper countermeasure to avoid the erroneous reading operation can be taken. The reliability of the data reading operation from the data carrier can therefore be remarkably improved.

Figure 8:
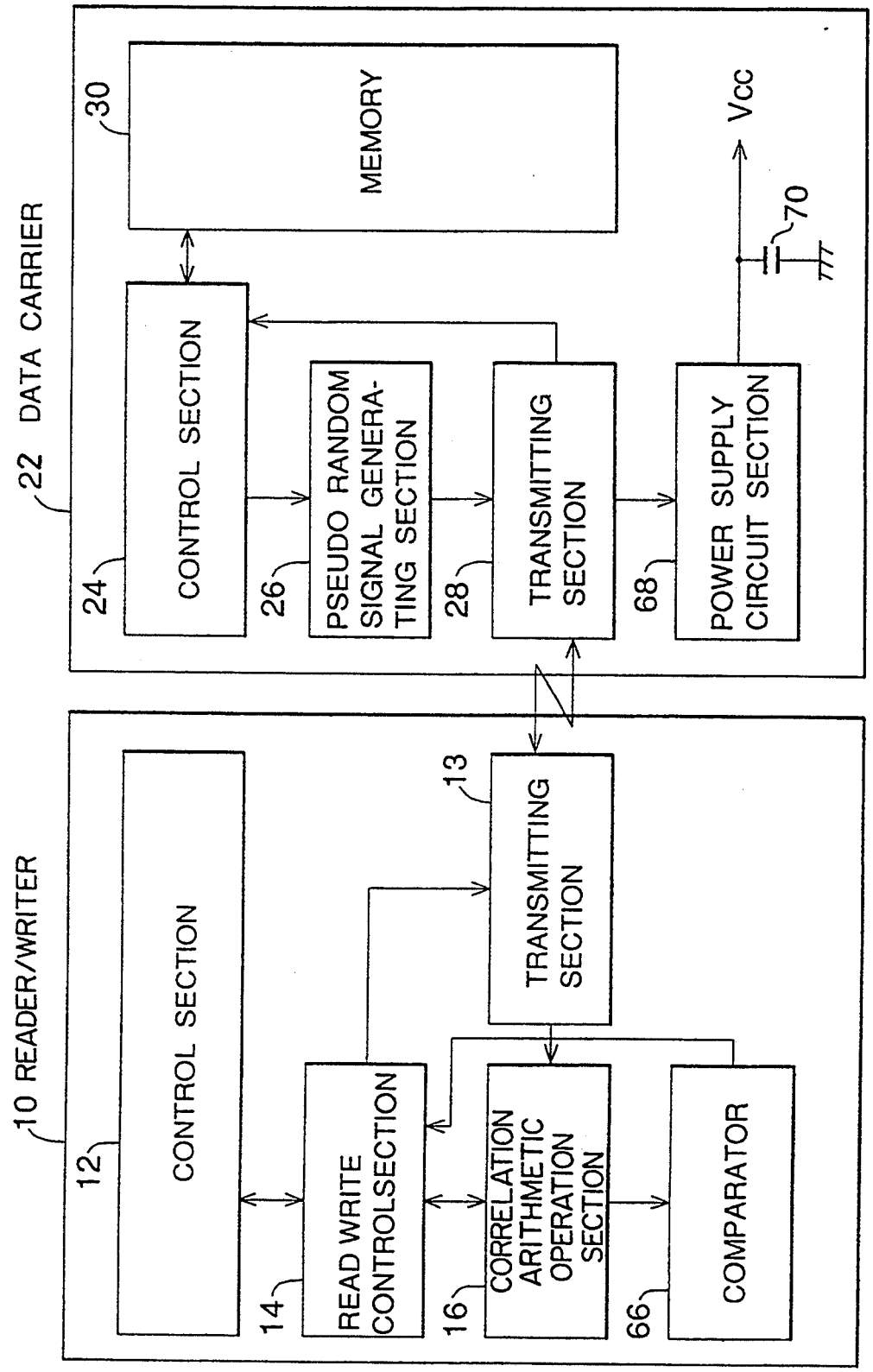
FIG. 8 is a block diagram showing the second embodiment of the invention.

FIG. 8 shows the second embodiment of the invention in which the operating electric power of the data carrier is checked and the reading operation is executed. The reader/writer 10 comprises the control section 12 using an MPU, read control section 14, correlation operating section 16, and transmitting section 18 in a manner similar to the embodiment of FIG. 2. Further, a comparing section 66 is provided for the reader/writer 10. The data carrier 22 comprises the non-volatile memory 30 such as an $E^2PROM$ or the like, control section 24 to perform the command judgment and the control based on the result of the judgment, pseudo random signal generating section 26, transmitting section 28, power supply circuit section 68, and capacitor 70 in a manner similar to the embodiment of FIG. 2. An electromagnetic inductive coupling using coils is used as a contactless coupling by the transmitting sections 18 and 28. The FSK modulation system is used as a data transmission from the reader/writer 10 to the data carrier 22. A pseudo random signal is sent in the data transmission from the reader/writer 10 to the data carrier 22. The pseudo random signal generating section 26 provided in the data carrier 22 is constructed as shown in FIG. 3.

Figure 9:
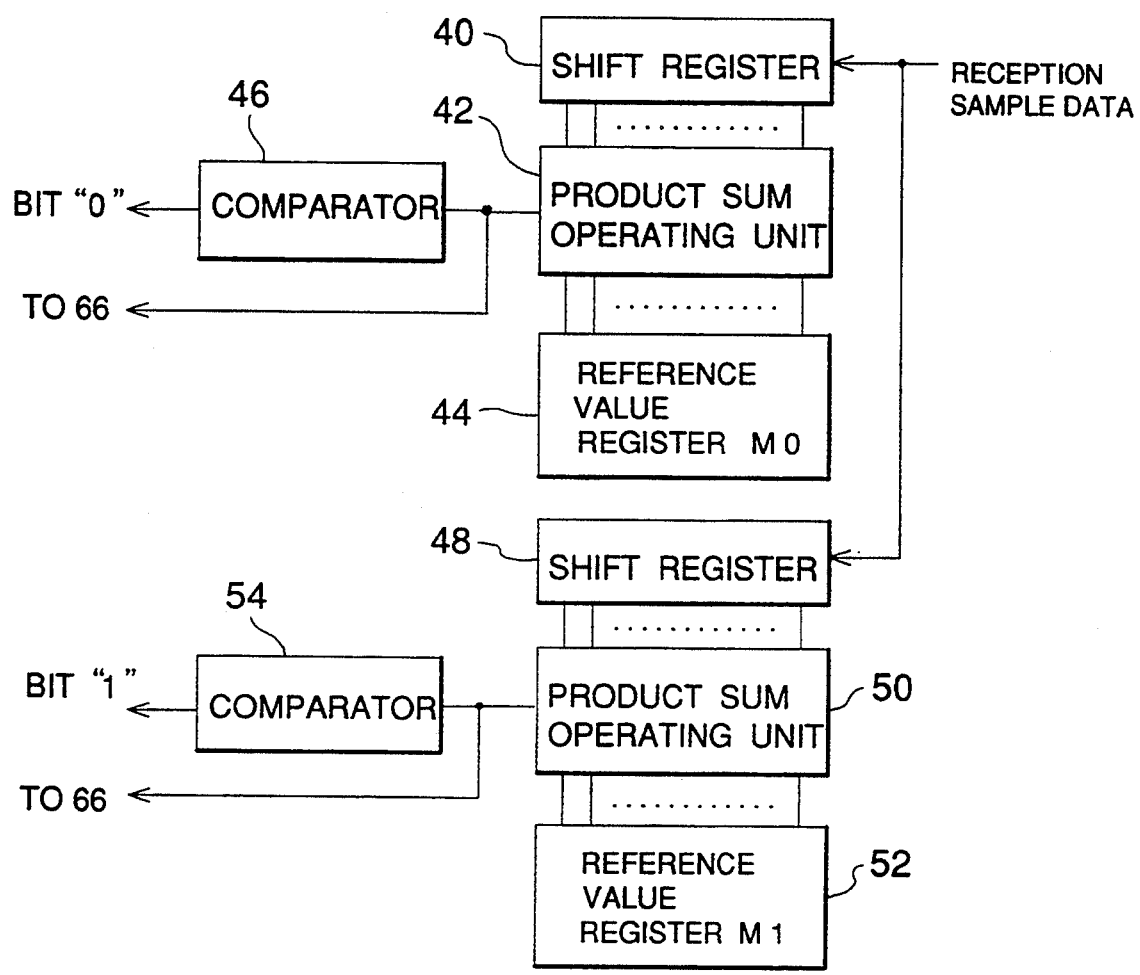
FIG. 9 is an explanatory diagram of a correlation arithmetic operating section provided in a reader/writer in FIG. 8.

FIG. 9 shows an embodiment of the correlation operating section 16 provided for the reader/writer 10 in FIG. 8. FIG. 9 is substantially the same as the first embodiment shown in FIG. 4 except for the fact that the output signals of the product sum operating units 42 and 50 are supplied to the comparing section 66 in FIG. 8.

Referring again to FIG. 8, in the second embodiment, prior to reading out from the data carrier 22, a predetermined command is generated from the read control section 14 provided for the reader/writer 10, thereby allowing the $M_0$ series signal to be returned from the pseudo random signal generating section 26 in correspondence to, for example, the bit 0. The comparing section 66 discriminates the autocorrelation peak value from the correlation operating section 16, thereby judging whether or not the operating electric power of the data carrier 22 is sufficient. On the basis of the result of the judgment, the reading operation is executed by the read control section 12.

Figure 10:
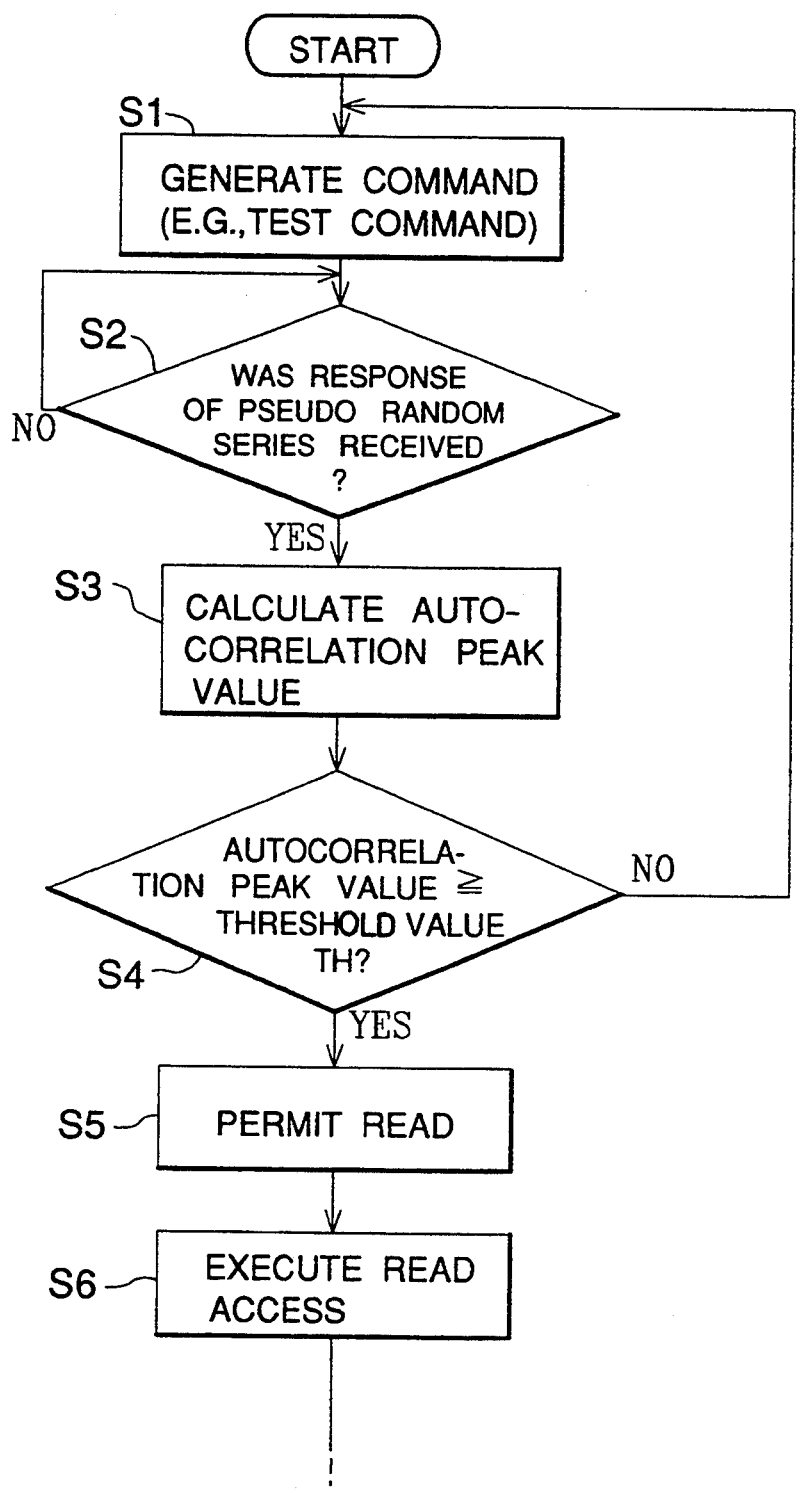
FIG. 10 is a flowchart showing the first embodiment of control processes in FIG. 8.

FIG. 10 is a flowchart showing the first embodiment of the control processes for checking the operating electric power of the data carrier 22 by the reader/writer 10 in FIG. 8. First, the read control section 14 of the reader/writer 10 generates a certain command, for example, a test command to obtain a response from the data carrier 22 at a predetermined period of time in step S1 under an instruction from the control section 12. When the data carrier 22 enters a range in which the reader/writer 10 can receive a signal, the data carrier 22 receives the FSK modulation signal by the contactless coupling. The power source voltage $V_{cc}$ exceeding a specified value is derived from the power supply circuit section 68. The data carrier 22 in the operative mode receives the command generated from the reader/writer 10 in step S1. When the control section 24 determines that the command is, for instance, a test command, the control section 24 instructs the pseudo random signal generating section 26 to generate a response of bit 0. The bit 0 responsive to the test command is generated as a status response indicating that, for example, the memory 30 is in the access inhibiting state (key locked state). On the other hand, when the memory 30 is in the access permitting state (key opening state), a status response of bit 1 is returned. The pseudo random signal generating section 26 which receives the return instruction of the bit 0 from the control section 24 activates the $M_0$ series generator 32 as shown in FIG. 3. The $M_0$ series signal is returned from the transmitting section 28. When the response of the pseudo random series signal is received in step S2 in the above state, the processing routine advances to step S3. In the correlation operating section 16, the autocorrelation peak values $C_0$ and $C_1$ between the reception series signal and the $M_0$ reference series signal and $M_1$ reference series signal are calculated by the circuit construction shown in FIG. 9. The output signals of the product sum operating units 42 and 50 are fed to the comparing section 66. In step S4, a check is made to see if $C_0$ and $C_1$ are equal to or larger than the predetermined threshold value TH. Now, since the data carrier 22 has already returned the $M_0$ series signal by the bit 0, the output of the product sum operating unit 42 is set to the peak value as shown in FIG. 5 after completion of the reception of the $M_0$ series signal and is larger than the threshold value TH. The result of the comparison is fed to the read control section 14. The read control section 14 determines that the power source voltage $V_{cc}$ of the data carrier 22 is a voltage which is enough to execute the reading operation, so that the reading operation is permitted and the read access is executed in step S6. On the other hand, when the autocorrelation peak value is smaller than the threshold value TH, the power source voltage $V_{cc}$ of the data carrier 22 is lacking. Therefore, in the embodiment, the processing routine is returned to step S1 and the test command is again generated. The corresponding pseudo random series are repeated. The process to compare the obtained autocorrelation peak values with the threshold value TH is repeated. When the autocorrelation peak value is smaller than the threshold value TH even after the passage of a certain period of time, it is also possible to stop the reading operation by determining that the access is impossible. Further, it is also possible to provide a function to permit the writing operation to the writing operating section of the reader/writer so long as the autocorrelation peak value is larger than a threshold value TH, which is larger than the threshold value TH'.

Figure 11:
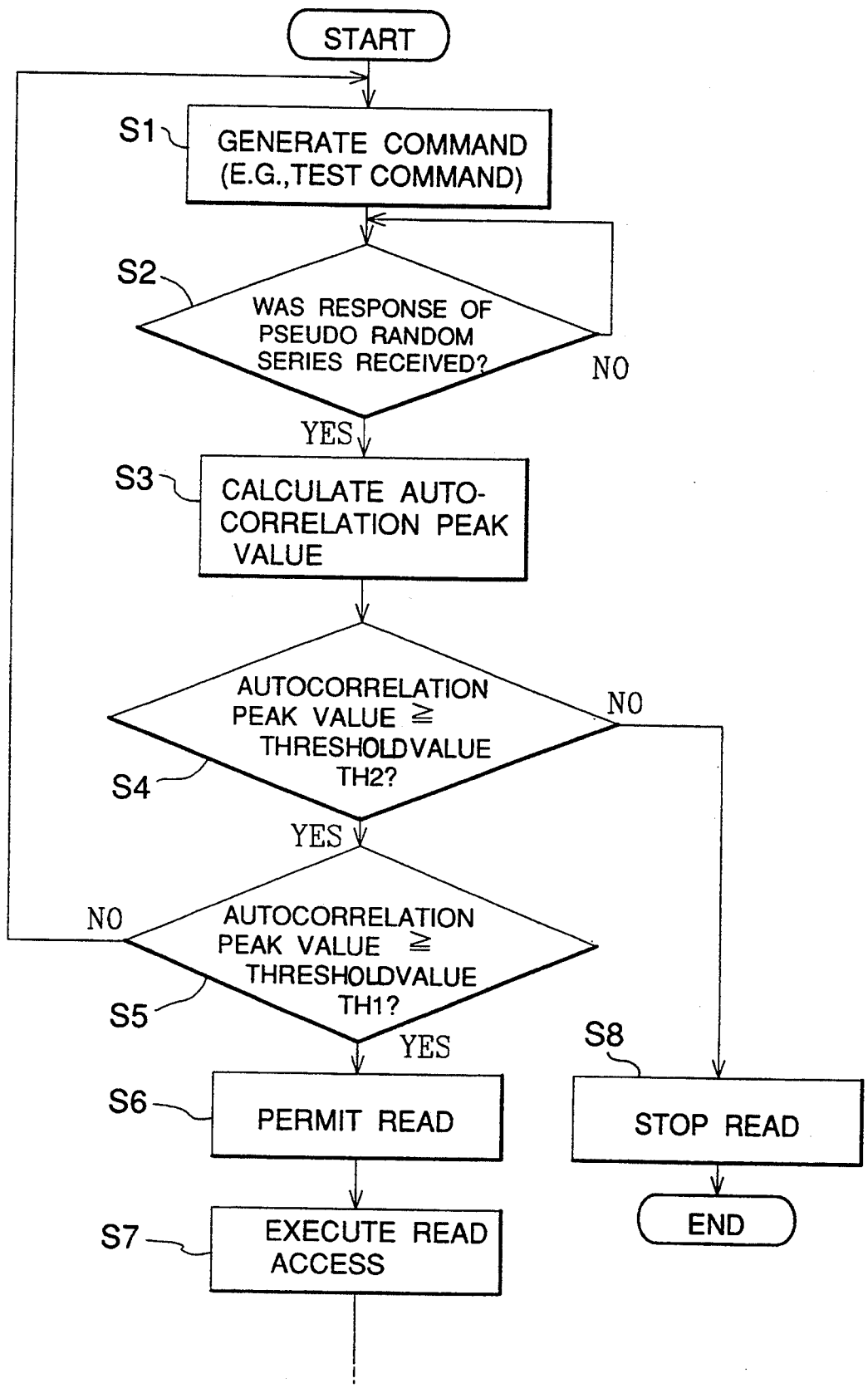
FIG. 11 is a flowchart showing the second embodiment of the control processes in FIG. 8.

FIG. 11 is a flowchart showing the second embodiment of the control process of the invention to discriminate the operating electric power of the data carrier by the reader/writer in FIG. 8. The embodiment of FIG. 11 is characterized in that after the autocorrelation peak value was calculated from the pseudo random signal obtained as a response to the generation of the command, the autocorrelation peak value is compared with a first threshold value $TH_1$ and, further, with a second threshold value $TH_2$ which is smaller than the first threshold value $TH_1$. For instance, in step S4, the autocorrelation peak value is first compared with the smaller threshold value $TH_2$. When it is equal to or larger than the threshold value $TH_2$, step S5 follows and the autocorrelation peak value is subsequently compared with the larger threshold value $TH_1$. When the autocorrelation peak value is equal to or greater than the threshold value $TH_1$, it is determined that the power source voltage $V_{cc}$ of the data carrier is high enough, so that the reading operation is permitted in step S6. The read access is executed in step S7. In the case where, on the other hand, although the autocorrelation peak value is equal to or greater than the smaller threshold value $TH_2$ in step S4, it is smaller than the larger threshold value $TH_1$ in step S5, the processing routine is returned to step S1 and the comparing processes in steps S1 to S5 are repeated. Further, when the autocorrelation peak value is smaller than the smaller threshold value $TH_2$ in step S4, step S8 follows and the reading operation is stopped.

Figure 12:
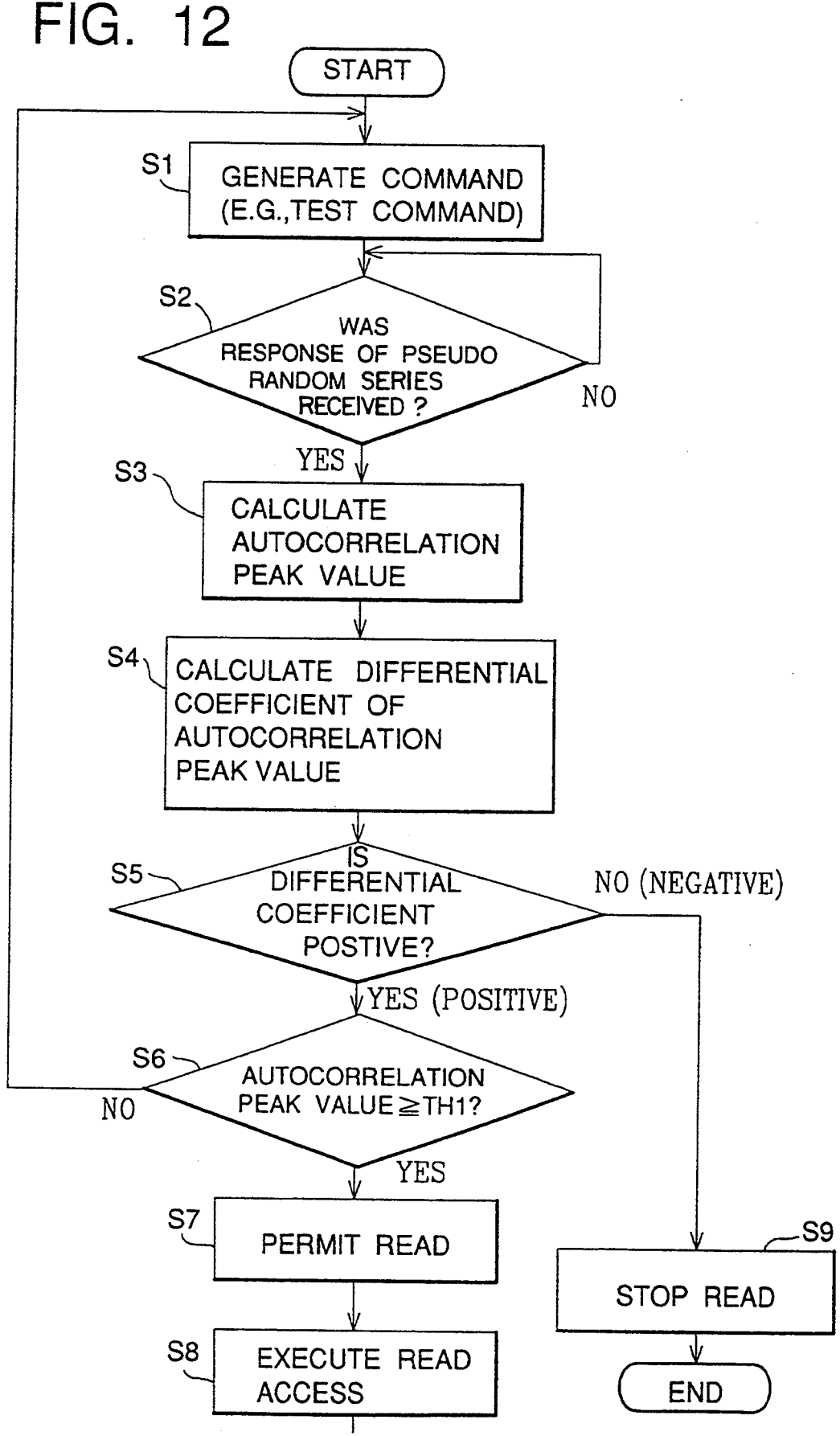
FIG. 12 is a flowchart showing the third embodiment of the control processes in FIG. 8.

FIG. 12 is a flowchart showing the third embodiment of the control process of the invention in which the operating electric power of the data carrier is presumed by the reader/writer in FIG. 8. The third embodiment is characterized in that a differential coefficient indicative of a change in autocorrelation peak value with the passage of time is obtained from a difference between the preceding and present autocorrelation peak values obtained in the respond due to the generation of the test command. That is, the present autocorrelation peak value $C_n$ is obtained from the response of the data carrier to the generation of the test command in step S3. In step S4, a differential coefficient $\Delta C$ is obtained as a difference between the preceding autocorrelation peak value $C_{n-1}$ which has already been obtained in step S4 and the present autocorrelation peak value $C_n$.

$$\Delta C = C_{n-1} - C_n$$

In step S5, a check is made to see if the differential coefficient $\Delta C$ of the autocorrelation peak value obtained in step S4 is positive or negative. When the differential coefficient $\Delta C$ is positive, step S6 follows and the autocorrelation peak value is compared with the predetermined threshold value $TH_1$. The threshold value $TH_1$ in this instance is the same as the first threshold value $TH_1$ used in the embodiment of FIG. 11. When the autocorrelation peak value is equal to or greater than the threshold value $TH_1$, it is determined that the power source voltage $V_{cc}$ of the data carrier is high enough, so that the reading operation is permitted. The read access is executed in step S8. When the autocorrelation peak value is smaller than the threshold value $TH_1$, the comparing processes based on the calculation of the differential coefficient in steps S1 to S5 are repeated. In the embodiment of FIG. 11, the reading operation is stopped when the autocorrelation peak value is smaller than the second threshold value $TH_2$ which is smaller than the first threshold value $TH_1$. In the embodiment of FIG. 12, however, even when the autocorrelation peak value is smaller than the second threshold value $TH_2$, so long as the differential coefficient $\Delta C$ is positive, it is considered that there is a tendency such that the autocorrelation peak value is increasing and that the autocorrelation peak value will be equal to the threshold value $TH_1$ during the repetition of the reading operation by the generation of the test command. Therefore, the comparing processes are repeated without stopping the reading operation. On the other hand, when the differential coefficient is negative in step S5, it is known that there is a tendency such that the autocorrelation peak value is decreasing. If the access is continued as it is, the communication will be impossible in future. Therefore, the reading operation is stopped in step S9.

According to the embodiment of FIG. 8 as mentioned above, whether the operating electric power of the data carrier is proper or insufficient can be judged on the reader/writer side. When the operating electric power is proper, then the reading operation is executed. When the operating electric power is lacking, then the present state is maintained for a little while or the operation is stopped. Therefore, it is possible to certainly prevent a problem in that the electric power shut-off of the data carrier occurs during the reading operation.

Figure 13:
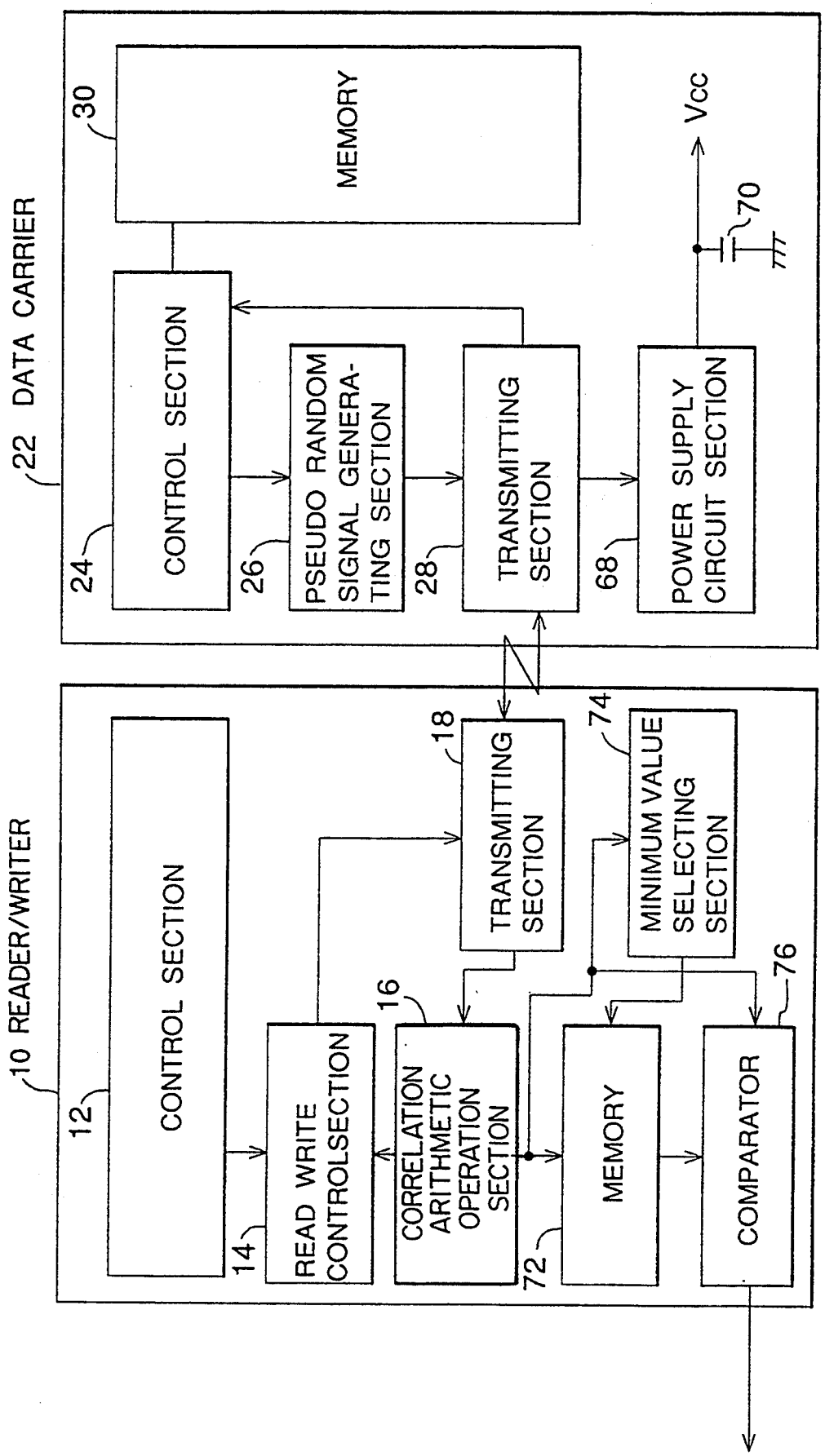
FIG. 13 is a block diagram showing the third embodiment of the invention.

FIG. 13 shows the third embodiment of the invention for discriminating that the data carrier is out of the communicating range. The data carrier 22 is constructed in substantially the same manner as the first embodiment of FIG. 2. The reader/writer 10 comprises the control section 12, read control section 14, correlation operating section 16, and transmitting section 18 in a manner similar to the embodiment of FIG. 2. However, a memory 72, a minimum value selecting section 74, and a comparing section 76 are newly provided for the reader/writer 10. In the data transmission by the FSK modulation from the reader/writer 10 to the data carrier 22, different frequencies $f_1$ and $f_2$ are provided in correspondence to the data bits 0 and 1. The data bits 1 and 0 are modulated by the corresponding frequencies $f_1$ and $f_2$ and transmitted. In the standby state, the reader/writer 10 always generates a signal of the frequency $f_1$ corresponding to the data bit 0, thereby setting the communication able area to a location near the coil of the reader/writer 10. The FSK modulation signal from the reader/writer 10 is induced in the coil of the transmitting section 28. The received signal is rectified and smoothed by the power supply circuit section 68, thereby charging the capacitor 70 and producing the power source voltage $V_{cc}$.

Figure 14:
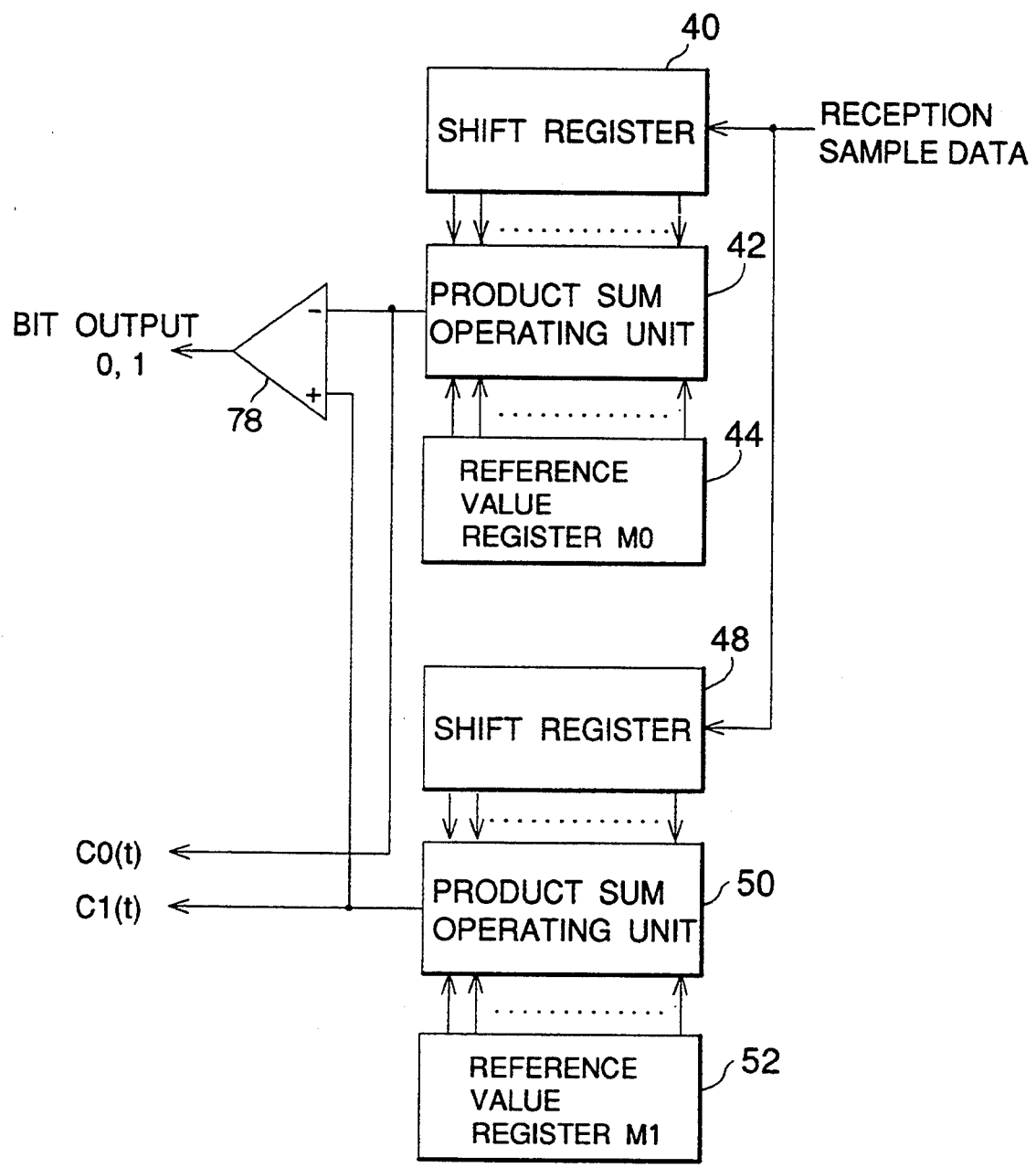
FIG. 14 is a block diagram of a correlation arithmetic operating section provided in a reader/writer in FIG. 13.

FIG. 14 shows the correlation operating section 16 provided for the reader/writer 10 in FIG. 13. The shift registers 40 and 48, product sum operating units 42 and 50, and reference value registers 44 and 52 are the same as those shown in FIG. 4. However, FIG. 14 differs from FIG. 4 in that the outputs of the product sum operating units 42 and 50 are compared by a comparator 78. Now, assuming that the autocorrelation peak values at the time point t at which the reception series signal obtained by each of the product sum operating units 42 and 50 coincides with the $M_0$ reference series signal and $M_1$ series signal are set to $C_0(t)$ and $C_1(t)$, the autocorrelation peak values $C_0(t)$ and $C_1(t)$ are fed to the comparator 78, so that the following bit outputs are generated.

When $C_0(t) > C_1(t)$, bit 0 (logic 0)
When $C_0(t) < C_1(t)$, bit 1 (logic 1)

Referring again to FIG. 13, when the data bit is continuously read out from the data carrier 22 by the read control section 14, the minimum value selecting section 74 provided for the reader/writer 10 compares larger one of a plurality of autocorrelation peak values $C_0(t)$ and $C_1(t)$ obtained by the correlation operating section 16 with the minimum memory value stored at present in the memory 72 every data bit and, when the former value is smaller than the minimum memory value, it is stored as a new minimum memory value into the memory 72. The above processes are repeated. Therefore, at a time point when the continuous reading operation of the data bit has been finished, the comparing section 76 compares the minimum memory value of the autocorrelation peak value stored in the memory 72 with the predetermined threshold value TH. When the minimum memory value in the memory 72 is smaller than the threshold value TH, it is determined that the data carrier 22 has been away from the reader/writer during the reading operation and the operating electric power is lacking and the data could not be correctly read out, so that a signal indicative of the reading error is generated. The read error signal of the comparing section 76 is fed to, for example, the higher-order apparatus of the reader/writer 10. A countermeasure such that a display apparatus is driven on the higher-order apparatus side and an error message is generated or an upper command to retry is generated to the control section 12 or the like is executed. The memory 72 has been initialized by a high enough large predetermined value just before the continuous reading operation is executed.

Figure 15:
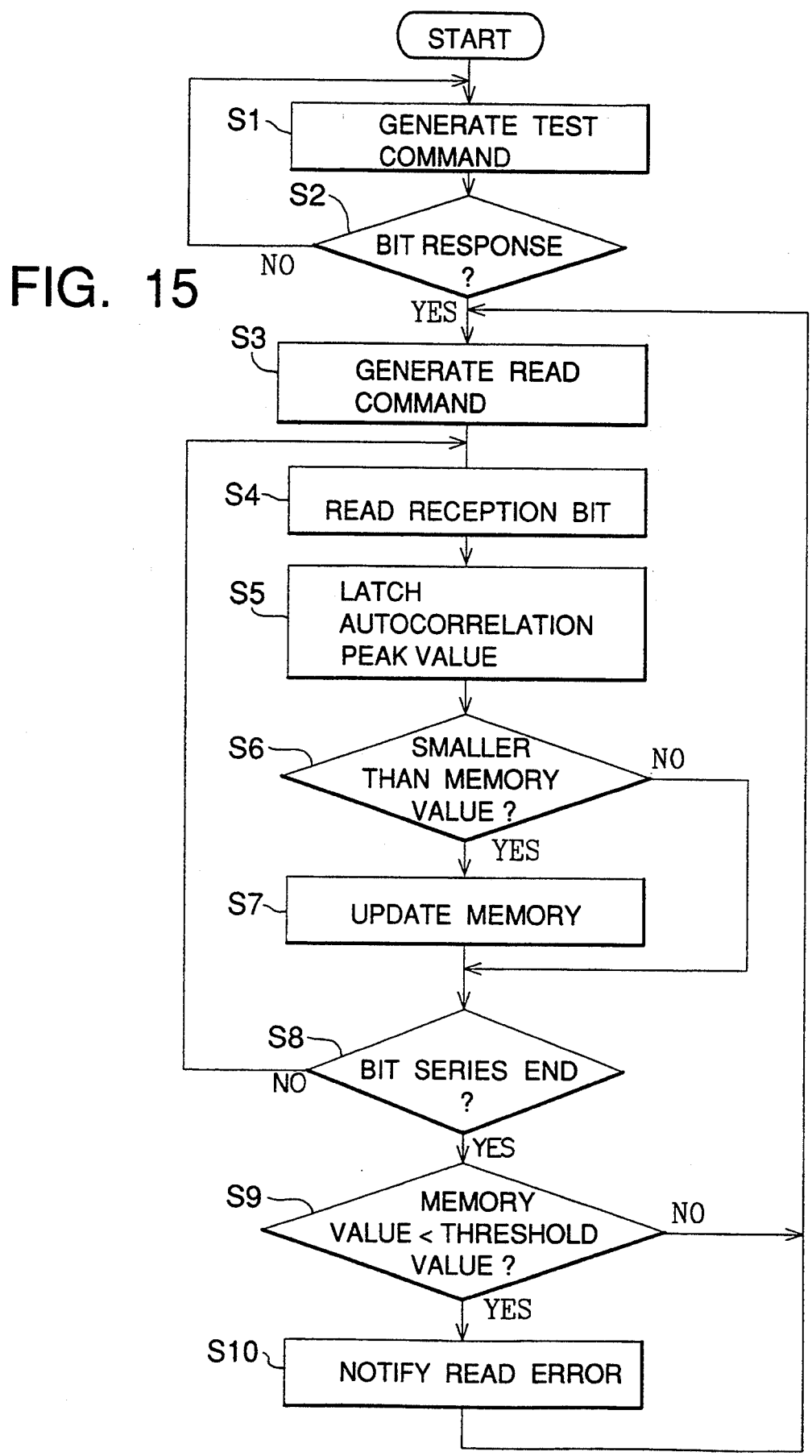
FIG. 15 is a flowchart showing control processes in FIG. 13.

FIG. 15 is a flowchart showing control processes in the reader/writer 10 in FIG. 13. As shown in step S1, the reader/writer 10 generates a test command prior to reading out. In this state, when it is assumed that the data carrier 22 approaches an area of a distance where the reader/writer can communicate and the power supply of the data carrier is turned on by the supply of the operating electric power and the data carrier starts the operation, the test command is decoded by the control section 24 of the data carrier 22. If the key has been locked in the memory 30, the bit 0 is returned. When the key of the memory 30 is open, the bit 1 is returned. Therefore, a bit response (status response) by the $M_0$ series signal or $M_1$ series signal corresponding to the bit 0 is first executed from the data carrier 22 in response to the generation of the test command. In step S2, the bit response by the return of the $M_0$ series signal or $M_1$ series signal from the data carrier 22 is discriminated. The response to bit 0 indicating that the key of the memory 30 has been locked is first derived. Therefore, in order to open the key, a read command of the ID number is generated in step S3.

Prior to generation of the read signal of the ID number, the autocorrelation peak value of the pseudo random signal received by the bit response is compared with the predetermined threshold value. When the autocorrelation value is equal to or larger than the threshold value, it is determined that the power source voltage $V_{cc}$ of the data carrier 22 is at a sufficiently high level. The read command is generated. When the autocorrelation value is smaller than the threshold value, it is determined that the power source voltage $V_{cc}$ of the data carrier 22 is lacking. The processing routine is returned to step S1 and the checking processes of the power source voltage $V_{cc}$ are repeated until the autocorrelation peak value of the bit response to the generation of the test command is equal to or greater than the threshold value.

When the read command of the ID number is generated in step S3, the continuous data bits of the read data indicative of the ID number are returned from the data carrier 22 as a combination of the $M_0$ series signal indicative of the bit 0 and the $M_1$ series signal indicative of the bit 1. In step S4, two autocorrelation peak values $C_0(t)$ and $C_1(t)$ are obtained and the bit data indicative of the larger one of them is read by the comparing processes. At the same time, the two greater of the autocorrelation peak values $C_0(t)$ and $C_1(t)$ is also latched in step S5. In step S6, the latched larger value is compared with the minimum memory value stored at present in the memory 72 in step S6. When the autocorrelation peak value obtained at present is smaller than the minimum memory value, in step S7, the content in the memory 72 to store as a new minimum memory value is updated in step S7. When it is equal to or greater than the threshold value, the process in step S7 is not executed. Subsequently, a check is made in step S8 to see if the reception of a series of bit series has been finished. The processes in steps S4 to S7 are repeated until the completion of the reception. Thus, upon completion of the signal reception, the minimum autocorrelation peak value among the continuous bit data is selected and held as a minimum memory value in the memory 72. When the end of reception of the bit series is detected in step S8, step S9 follows and the minimum memory value stored in the memory 72 is compared with the predetermined threshold value TH. When it is smaller than the threshold value, it is determined that the data carrier 22 has been away from the reader/writer during the reading operation and a lack of electric power has occurred. In step S10, for example, an error signal is sent to a higher-order apparatus. In response to the error signal notification, the higher-order apparatus displays a message so as to instruct the person having the data carrier 22 to approach to a distance at which the reader/writer can communicate, thereby allowing a correct reading state to be repeated. When the minimum memory value is equal to or greater than the threshold value in step S9, it is determined that the data has correctly been read out. The process based on the read data is executed. The processing routine is again returned to step S3 and the next access is performed. The minimum memory value in the memory 72 is initialized each time one reading operation by the transmission of the continuous data bits is finished, thereby preparing for the next process.

According to the embodiment of FIG. 13 as mentioned above, even when a lack of electric power or the like occurs during the reading operation from the data carrier, such a fact that data could not correctly be read out due to a lack of electric power or the like is automatically discriminated and an error can be noted. A proper operation can be instructed to the operator. The unnecessary processing of the wrong read data can be prevented. The reliability of the data reading operation can be remarkably improved.

Although the above embodiments have been described with respect to the example of the contactless coupling by the electromagnetic inductive coupling system, the invention can be also applied to other proper contactless coupling systems such as optical transmission systems, radio wave systems, and the like. An example of the M series signal has been described as a pseudo random signal. However, other proper pseudo random signals can be also used. Further, in the above embodiments, the peculiar pseudo random signals, that is, the $M_0$ series signal and $M_1$ series signal have been used in correspondence to the data bits 0 and 1. However, it is also possible to prepare the M series signal for only the data bit 1 and to stop the transmission of the M series signal with respect to the data bit 0. Further, the present invention is not limited by the numerical values shown in the above embodiments.

What is claimed is:

1. A contactless data processing apparatus comprising:
   a portable data carrier means for receiving a contactless coupling from an outside source and for executing at least a reading operation of data from said outside source to a built-in memory means; and
   a data processing means for executing at least the reading operation of data from said outside source to said data carrier means by the contactless coupling;
   wherein said data carrier means has a response means for returning one of two kinds of pseudo random signals which have been predetermined in correspondence to a bit 0 or 1 of response data when a predetermined command is received from said data processing means; and
   said data processing means has:
   a correlation operating means for holding the same signals as said two kinds of pseudo random signals of said data carrier means and for obtaining autocorrelations with a received signal; and
   a judging means for determining that two or more data carrier means have been simultaneously accessed by an outside source when the autocorrelation values of said two kinds of pseudo random signals which have been obtained by said correlation operating means are simultaneously equal to or greater than a predetermined threshold value.

2. An apparatus according to claim 1, wherein when said judging means of said data processing means has determined that two or more data carrier means have been simultaneously accessed, an access inhibiting command to inhibit the subsequent access is generated and inputted to said data carrier means.

3. An apparatus according to claim 2, wherein said data carrier means has access suppressing means for making it impossible access to all of the memory areas when said access inhibiting command is received.

4. An apparatus according to claim 2, wherein said data carrier means has access suppressing means for making it impossible access to a part of the memory areas when said access inhibiting command is received.

5. An apparatus according to claim 1, wherein the occurrence of an error is indicated when said judging means of said data processing means determines that two or more data carrier means have been simultaneously accessed.

6. An apparatus according to claim 1, wherein when said judging means of said data processing means have been determines that two or more data carrier means simultaneously accessed, the access is stopped at a time point when said determination has been made.

7. An apparatus according to claim 1, wherein said judging means of said data processing means have been determines that two or more data carrier means simultaneously accessed, said access is retried.

8. An apparatus according to claim 1, wherein said data carrier means has a power supply means for generating an operating electric power from a transmission signal of said data processing means, and when said judging means determines that two or more data carrier means have been simultaneously accessed, said data processing means stops the transmission to the data carrier means, thereby shutting off the electric power supply.

9. An apparatus according to claim 1, wherein said data processing means has a write access means for writing data into said data carrier means, and in the case when said judging means of said data processing means determines that two or more data carrier means have been simultaneously accessed, the write access to the data carrier means is inhibited.

10. A contactless data processing apparatus comprising:
   a portable data carrier means for receiving a contactless coupling from an outside source and for executing at lest a reading operation of data from said outside source to a built-in memory means; and
   a data processing means for executing at least the reading operation of data from said outside source to said data carrier means by the contactless coupling;
   and wherein said data carrier means has a response means for returning a predetermined pseudo random signal when a predetermined command is received from a reader/writer means; and
   said data processing means has:

a correlation operating means for obtaining an autocorrelation between the same signal as said pseudo random signal of said data carrier means and a received signal; and a read control means for executing the reading operation when an autocorrelation peak value obtained by said correlation operating means at a time point when the received signal coincides with a reference signal is equal to or greater than a predetermined threshold value;

wherein said read control means of said data processing means has a first threshold value $TH_1$ and a second threshold value $TH_2$ which is smaller than said first threshold value, and when the autocorrelation peak value obtained by said correlation operation means is equal to or greater than said first threshold value $TH_2$, the reading operation is executed, and when the autocorrelation peak value is smaller than the first threshold value $TH_1$ and is equal to or greater than said second threshold value $TH_2$, a comparing process for comparing the received signal of the pseudo random signal returned from the data carrier means and the autocorrelation peak value is repeated by a generation of a command, and when the autocorrelation peak value is smaller than the second threshold value $TH_2$, the reading operation is stopped.

11. A contactless data processing apparatus comprising:

a portable data carrier means for receiving a contactless coupling from an outside source and for executing at lest a reading operation of data from said outside source to a built-in memory means; and a data processing means for executing at least the reading operation of data from said outside source to said data carrier means by the contactless coupling;

and wherein said data carrier means has a response means for returning a predetermined pseudo random signal when a predetermined command is received from a reader/writer means; and said data processing means has:

a correlation operating means for obtaining an autocorrelation between the same signal as said pseudo random signal of said data carrier means and a received signal; and a read control means for executing the reading operation when an autocorrelation peak value obtained by said correlation operating means at a time point when the received signal coincides with a reference signal is equal to or greater than a predetermined threshold value;

wherein said read control means of said data processing means obtains a differential coefficient indicative of an aging change between the preceding and present autocorrelation peak values, and when said differential coefficient is positive, it is determined that there is a tendency such that the autocorrelation peak value is increasing, and the comparing process to compare the autocorrelation peak value with the predetermined threshold value TH is repeated and, when the autocorrelation peak value is equal to or greater than the threshold value TH, the reading operation is executed, and further when the differential coefficient is negative, it is determined that there is a tendency such that the autocorrelation peak value is decreasing, and the reading operation is stopped.

12. A contactless data processing apparatus comprising:

a portable data carrier means for receiving a contactless coupling from an outside source and for executing at least a reading operation of data from said outside source to a built-in memory means; and a data processing means for executing at least the reading operation of data from said outside source to said data carrier means by a contactless coupling;

wherein said data carrier means has a response means for receiving and decoding a command from said data processing means and for returning arbitrary response data as a predetermined pseudo random signal corresponding to a bit; and said data processing means has:

a correlation operating means for obtaining an autocorrelation between the same reference signal as said pseudo random signal of said data carrier means and a received signal;

a minimum value selecting means for selecting a minimum value among the autocorrelation peak values of every bit obtained by said correlation operating means and for storing said minimum value in a memory, and a comparing means for generating a signal indicative of a read error when said minimum memory value in said memory is smaller than a predetermined threshold value.

13. An apparatus according to claim 12, wherein said comparing means of said data processing means displays a message for allowing the data carrier means to approach a position at a distance where said data processing means can communicate by the generation of said read error signal.

* * * * *